(12) United States Patent
Chen

(10) Patent No.: US 7,898,672 B1
(45) Date of Patent: *Mar. 1, 2011

(54) REAL-TIME SCANNER-NONLINEARITY ERROR CORRECTION FOR HDVSI

(75) Inventor: Dong Chen, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 291 days.

This patent is subject to a terminal disclaimer.

(21) Appl. No.: 12/082,846

(22) Filed: Apr. 15, 2008

Related U.S. Application Data

(63) Continuation-in-part of application No. 11/473,447, filed on Jun. 23, 2006, now Pat. No. 7,605,925.

(51) Int. Cl.
    *G01B 11/02* (2006.01)
(52) U.S. Cl. ..................................... 356/516
(58) Field of Classification Search ............... 356/485, 356/489, 495, 496, 511–514, 516, 521, 497
    See application file for complete search history.

(56) References Cited

U.S. PATENT DOCUMENTS

| | | | | |
|---|---|---|---|---|
| 5,706,085 A * | 1/1998 | Blossey et al. | ............... | 356/512 |
| 5,777,741 A * | 7/1998 | Deck | ............... | 356/511 |
| 6,624,893 B1 * | 9/2003 | Schmit et al. | ............... | 356/511 |
| 6,624,894 B2 * | 9/2003 | Olszak et al. | ............... | 356/511 |
| 6,987,570 B1 * | 1/2006 | Schmit et al. | ............... | 356/511 |
| 7,277,183 B2 * | 10/2007 | Deck | ............... | 356/497 |
| 7,283,250 B2 * | 10/2007 | Schmit et al. | ............... | 356/512 |
| 7,321,430 B2 * | 1/2008 | Deck | ............... | 356/497 |
| 7,605,925 B1 * | 10/2009 | Chen | ............... | 356/511 |

OTHER PUBLICATIONS

Matthias Fleischer et al., "Fast Algorithms for Data Reduction in Modern Optical . . . ," Applied Optics, vol. 39, No. 8, Mar. 10, 2000.

* cited by examiner

*Primary Examiner*—Gregory J Toatley
*Assistant Examiner*—Scott M Richey
(74) *Attorney, Agent, or Firm*—Antonio R. Durando

(57) ABSTRACT

An error correction for scanner position is implemented by adjusting the filter parameters of the quadrature demodulation module of an HDVSI algorithm using a reference signal from an independent position measurement device (PMD). The step size generated by the PMD at each scanner step is substituted for the nominal scanner step in the quadrature demodulation algorithm calculating phase and in the coherent envelope algorithm calculating peak. This substitution eliminates all errors produced by scanner nonlinearities. Furthermore, over the large number of steps carried out during a normal scanning range, random scanner-position errors (such as produced by vibration and other system noise) are automatically corrected by integration over their normal distribution around the noise-free position value. Therefore, a complete correction of scanner-position error may be achieved using the reference signal.

9 Claims, 5 Drawing Sheets

REAL-TIME SCANNER-NONLINEARITY ERROR CORRECTION FOR HDVSI

RELATED APPLICATIONS

This is a continuation-in-part application of U.S. application Ser. No. 11/473,447, filed Jun. 23, 2006, now U.S. Pat. No. 7,605,925.

BACKGROUND OF THE INVENTION

1. Field of the Invention

This invention relates in general to vertical-scanning interferometry (VSI) for surface characterization. In particular, it relates to an error-correction method for the high-definition vertical-scan interferometric (HDVSI) procedure described in Ser. No. 11/473,447, herein incorporated by reference.

2. Description of the Related Art

The well known techniques generally classified as phase-shifting interferometry (PSI) and vertical scanning interferometry (VSI) make it possible to measure the profile of most samples. However, they do not allow low-noise measurement of samples that combine smooth surfaces with large profile gradients and discontinuities. Measuring the profile of such samples requires the large scanning range of VSI (with vertical resolution in the order of $1/100$ of a wavelength), while characterizing a smooth surface texture requires the resolution normally afforded by PSI (in the order of $1/1000$ of a wavelength or less).

This problem has been addressed by the development of enhanced VSI algorithms (named EVSI in the art) that combine both PSI and VSI. In particular, Ser. No. 11/473,447 disclosed a new approach (named HDVSI, from high-definition VSI) based on performing a coarse calculation of surface profile with a conventional VSI method such as center of mass (COM), quadrature center of mass (QCOM), or zero crossing detection (ZCD), and concurrently performing a phase calculation carried out using the same irradiance frame data acquired for VSI. However, the phase calculation does not utilize the conventional n-frame phase shifting approach of the prior art. Instead, it utilizes a quadrature-demodulation (QD) algorithm applied to the irradiance data contained in the VSI correlogram.

As a result of this concurrent procedure, the phase calculation is independent of the position of any particular interferometric fringe and, therefore, it is more accurate and its results are more certain than those produced by the combined VSI/PSI methods of the prior art. Once both calculations are accomplished, the phase data are incorporated into the coarse profile data through a unique "unwrapping" method that yields a final surface map with sub-nanometer resolution within a large z-height range.

The HDVSI algorithm decouples the calculation of phase from the calculation of fringe-intensity peak. This results from the fact that QD manipulation of the correlogram data does not require a prior determination of the position of the coherence intensity peak. Therefore, the calculated phase map of the surface does not inherit the errors produced by the calculation of the coarse map. Such errors are removed from the coarse map, prior to combining it with the phase map, by consistently rounding all VSI measurements to an integer multiple of $2\pi$. In other words, the VSI coarse map is rounded to an integer multiple of $\lambda/2$. (Typically, the accuracy of a VSI coarse map is much better than $\lambda/2$.) As a result, the VSI errors are completely removed from the VSI coarse map through the rounding process, an achievement that is not possible with prior-art approaches. Thus, the HDVSI algorithm allows profiling to sub-nanometer accuracy with conventional equipment, the only necessary changes being in the computational components required to round the VSI data, to implement the QD algorithm, and to combine the phase data with the corrected VSI data in real time, as data are acquired during the scan.

Ideally, the scanner steps and the effective wavelength of the light source are constant and can be determined through precise calibration procedures. However, in reality the scanner position suffers from system errors, such as scanner nonlinearity and random deviations due to mechanical vibrations. Similarly, the effective wavelength of the light source changes with the slope of the sample surface and also as a result of scanner nonlinearities. Therefore, the scanner sampling step and the effective wavelength are not constant and cause errors that distort the measured sample-surface profile.

An analysis of the error produced by scanner position shows that, when constant filter parameters ($k_0$ and $\Delta\Phi_0$, defined below) are used and when scanner errors ($\delta_z$) are present in the scanner position, the phase obtained from the HDVSI demodulation filter is a combination of the true sample phase ($\Phi$) and a phase error ($\zeta_\Phi$) related to the scanner-position error. In particular, as the VSI scan is implemented through a plurality of scanning steps ($\Delta\Phi$ or $\Delta z$, with reference to phase or distance, respectively) of predetermined nominal size (referred to herein interchangeably as nominal scan steps or phase steps), each detector pixel produces a signal with an amplitude that passes through and drops off very rapidly from its maximum value [$I_{max}$, corresponding to zero optical path difference (OPD)]. The interferometric signal can be expressed as $$I(n) = G(z_n - z_0)\cos(2nk_0\Delta z_n - \Phi), \qquad (1)$$

where $G(z_n - z_0)$ is, for example, the Gaussian envelope of the correlogram (i.e., the amplitude of irradiance at each scanner position); $z_0$ and $z_n$ are the positions of the scanning objective at zero OPD and at the $n^{th}$ scanning step, respectively; $k_0$ is the wave number (i.e., $k_0 = 2\pi/\lambda_0$, $\lambda_0$ being the effective wavelength of the illumination); and $\Delta z_n$ and $\Phi$ are the $n^{th}$ scan step and the phase of the correlogram, respectively. Note that the factor of 2 in the cosine function results from the fact that every scanning step $\Delta z_n$ produces twice that change in OPD.

As taught in Ser. No. 11/473,447, the interferometric signals I(n) are manipulated with the HDVSI algorithm to produce a low-noise sub-nanometer resolution surface map. The HDVSI algorithm comprises several steps. After undergoing pre-processing filtration, if needed, the input to the algorithm (i.e., the interferometric irradiance signals produced by the VSI scan) is processed simultaneously in two ways that allow for the independent calculation of a coarse height $z_0$ of each surface point and of the phase $\Phi$ of the correlogram corresponding to that point. In the aggregate, the values of $z_0$ and $\Phi$ for all surface points imaged onto the light detector yield a coarse surface map, $z_{VSI}(x,y)$, and a high-definition phase map, $\Phi(x,y)$, of the test surface, respectively. As one skilled in the art would readily understand, the phase map $\Phi(x,y)$ can be equivalently expressed as a fine surface (or height) map, $z_{HD}(x,y)$, because the phase difference between two surface points is directly proportional to the difference in their heights. Therefore, for the purposes of this disclosure, the maps $\Phi(x,y)$ and $z_{HD}(x,y)$ and the corresponding terms "phase map," "surface map," "height map" and "map" may be used interchangeably. As a separate step of the HDVSI algorithm, the two maps are judiciously combined to generate the final high-definition surface map, $z_{HDVSI}(x,y)$.

The phase $\Phi$ of the correlogram is determined by applying a quadrature-demodulation approach. (See, for instance, M. Fleischer et al., "Fast algorithms for data reduction in modern optical three-dimensional measurement systems with MMX technology," Applied Optics, Vol. 39, No. 8, March 2000, pp. 1290-1297.) The signal I(n) is passed through a QD filter that performs several operations. First, the irradiance signal is differentiated to eliminate the DC component in the original correlogram. Then, it is split into "in-phase" and "quadrature" signal components, J and Q, respectively, wherein $$Q_n = G(z_n - z_0)\cos(n2k_0\Delta z_n - \Phi)\sin(n2k_0\Delta z_0) \text{ and} \quad (2a)$$

$$J_n = G(z_n - z_0)\cos(n2k_0\Delta z_n - \Phi)\cos(n2k_0\Delta z_0) \quad (2b)$$

where $\Delta z_n$ is the actual size of the $n^{th}$ scan step and $\Delta z_0$ is the parameter of the filter, chosen to match the nominal step size of the scan [typically equal to $m\lambda_0/8$, $m=0, 1, 2 \ldots$].

The deviations of the scanner from its nominal performance may be represented by a generalized step error $\delta$, as follows, $$\Delta z_n = \Delta z_0 + \delta_z. \quad (3)$$

Assuming a nominal scan step of $\lambda_0/8$ (i.e., 90°) and substituting for $\Delta z_n$, $\Delta z_0$ and $k_0$ in Equations 2a and 2b, yields the following:

$$Q_n = G(n)\cos[n(\pi/2 + 2k_0\delta_z) - \Phi]\sin(n\pi/2) \text{ and} \quad (4a)$$

$$J_n = G(n)\cos[n(\pi/2 + 2k_0\delta_z) - \Phi]\cos(n\pi/2). \quad (4b)$$

The quadrature demodulation procedure involves calculating the ratio $$\left(\frac{\sum_{n=1}^{N} Q_n}{\sum_{n=1}^{N} J_n}\right). \quad (5)$$

Accordingly, from Equation 4a, $$\sum_{n=1}^{N} Q_n = \sum_{n=1}^{N} G(n)\cos\left(n\left(\frac{\pi}{2} + 2k_0\delta_z\right) - \Phi\right)\sin\left(n\frac{\pi}{2}\right). \quad (6a)$$

Equation 2b similarly yields:

$$\sum_{n=1}^{N} J_n = \sum_{n=1}^{N} G(n)\cos\left(n\left(\frac{\pi}{2} + 2k_0\delta_z\right) - \Phi\right)\cos\left(n\frac{\pi}{2}\right). \quad (6b)$$

Applying to Equation 6a the general trigonometric formulas $$\sin(a+b) = \sin(a)\cos(b) + \cos(a)\sin(b) \text{ and} \quad (7a)$$

$$\sin(a-b) = \sin(a)\cos(b) - \cos(a)\sin(b), \quad (7b)$$

which, combined, produce the relation $$\sin(a+b) - \sin(a-b) = 2\cos(a)\sin(b), \quad (8)$$

Equation 6a becomes $$2\sum_{n=1}^{N} Q_n = \sum_{n=1}^{N} G(n)\sin(n\pi + 2nk_0\delta_z - \Phi) - \sum_{n=1}^{N} G(n)\sin(2nk_0\delta_z - \Phi) \quad (9)$$

The first summation term is approximately zero when $N \gg 1$; therefore, $$2\sum_{n=1}^{N} Q_n = -\sum_{n=1}^{N} G(n)\sin(2nk_0\delta_z - \Phi) = \quad (10a)$$

$$-\cos(\Phi)\sum_{n=1}^{N} G(n)\sin(2nk_0\delta_z) + \sin(\Phi)\sum_{n=1}^{N} G(n)\cos(2nk_0\delta_z)$$

which follows from Equation 7b. Similarly, $$2\sum_{n=1}^{N} J_n = \cos(\Phi)\sum_{n=1}^{N} G(n)\cos(2nk_0\delta_z) + \sin(\Phi)\sum_{n=1}^{N} G(n)\sin(2nk_0\delta_z) \quad (10b)$$

Equations 10a and 10b may be further simplified by setting $$\sum_{n=1}^{N} G(n)\cos(2nk_0\delta_z) = a \text{ and} \quad (11a)$$

$$\sum_{n=1}^{N} G(n)\sin(2nk_0\delta_z) = b \quad (11b)$$

which yields $$2\sum_{n=1}^{N} Q_n = -\cos(\Phi)b + \sin(\Phi)a, \text{ and} \quad (12a)$$

$$2\sum_{n=1}^{N} J_n = \cos(\Phi)a + \sin(\Phi)b. \quad (12b)$$

Defining the error in terms of a new variable $\zeta_z$ in phase space, such that $$\cos(\zeta_z) = \frac{a}{\sqrt{a^2 + b^2}} \text{ and} \quad (13a)$$

$$\sin(\zeta_z) = \frac{b}{\sqrt{a^2 + b^2}}, \quad (13b)$$

and further dividing Equations 12a and 12b by $\sqrt{a^2+b^2}$ and substituting Equations 13a and 13b produces the following relations in terms of the phase error $\zeta_z$:

$$2\sum_{n=1}^{N} Q_n / \sqrt{a^2 + b^2} = -\cos(\Phi)\sin(\zeta_z) + \sin(\Phi)\cos(\zeta_z) \quad (14a)$$
$$= \sin(\Phi - \zeta_z), \text{ and}$$

$$2\sum_{n=1}^{N} J_n / \sqrt{a^2 + b^2} = \cos(\Phi)\cos(\zeta_z) + \sin(\Phi)\sin(\zeta_z) \quad (14b)$$
$$= \cos(\Phi - \zeta_z).$$

Finally, dividing Equations 14a and 14b yields $$\left(\frac{\sum_{n=1}^{N} Q_n}{\sum_{n=1}^{N} J_n}\right) = \frac{\sin(\Phi - \zeta_z)}{\cos(\Phi - \zeta_z)}, \text{ or } \Phi - \zeta_z = \tan^{-1}\left(\frac{\sum_{n=1}^{N} Q_n}{\sum_{n=1}^{N} J_n}\right). \quad (15)$$

From Equation 15 it is apparent that, when constant filter parameters ($k_0, \Delta z_n$) are used and scanner errors ($\zeta_z$) are present during the scan, the phase obtained from the demodulation filter is the combination of the true sample phase $\Phi$ and a phase error $\zeta_z$ related to the scanner-position error.

If the scanner-position error is random, then the quadrature demodulation process automatically suppresses the error. Referring to Equation 11b, it is clear that a small random error $\delta_z$ will produce positive and negative values that cancel out, that is, $$\sum_{n=1}^{N} G(n)\sin(2nk_0\delta_z) = b \approx 0. \quad (16)$$

Accordingly, $$\cos(\zeta_z) = \frac{a}{\sqrt{a^2 + b^2}} \cong 1 \text{ and} \quad (17a)$$

$$\sin(\zeta_z) = \frac{b}{\sqrt{a^2 + b^2}} \cong 0, \quad (17b)$$

which means that $\zeta_z = 0$ and, in turn, $$\tan^{-1}\left(\frac{\sum_{n=1}^{N} Q_n}{\sum_{n=1}^{N} J_n}\right) = \Phi - \zeta_z = \Phi. \quad (18)$$

This is demonstrated in FIG. 1, wherein the fringe-like noise produced by random scanner-position error on phase calculated using conventional n-frame PSI algorithms is illustrated in the top image of the figure. As seen in the bottom image, the integration operation in the HDVSI demodulation filter causes the error term $\delta_z$ to near zero, so the fringe noise is effectively suppressed.

Thus, the remaining scanner-position errors are produced by scanner nonlinearity. This invention is directed at providing real-time correction of such errors. A related approach for the correction of errors caused by changes in the system's effective wavelength is described in a separate disclosure.

BRIEF SUMMARY OF THE INVENTION

The invention is based on combining the HDVSI procedure disclosed in Ser. No. 11/473,447 with a reference signal produced contemporaneously during the scan of the object. In HDVSI, the phase and the peak of the coherent envelope of the correlogram are calculated independently and in parallel. The phase of the correlogram is calculated using a quadrature demodulation technique wherein the nominal scanner step size and the effective wavelength are filter parameters. The peak position of the coherent envelope is similarly calculated with an algorithm (such as COM) wherein the nominal scanner step size is a parameter.

According to one aspect of the present invention, the error correction for scanner position is implemented by adjusting the filter parameters of the quadrature demodulation algorithm using a reference signal from an independent position measurement device (PMD), rather than using the nominal scanner step. The step size generated by the PMD at each scanner step is substituted for the nominal scanner step in the quadrature demodulation algorithm calculating phase and in the coherent envelope algorithm calculating peak. As detailed below, this substitution eliminates all errors produced by scanner nonlinearities. Furthermore, over the large number of steps carried out during a normal scanning range, random scanner-position errors (such as produced by vibration and other system noise) are automatically corrected by integration over their normal distribution around the noise-free position value. Therefore, a complete correction of scanner-position error is achieved using a reference signal according to the invention.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE INVENTION

Figure 1:
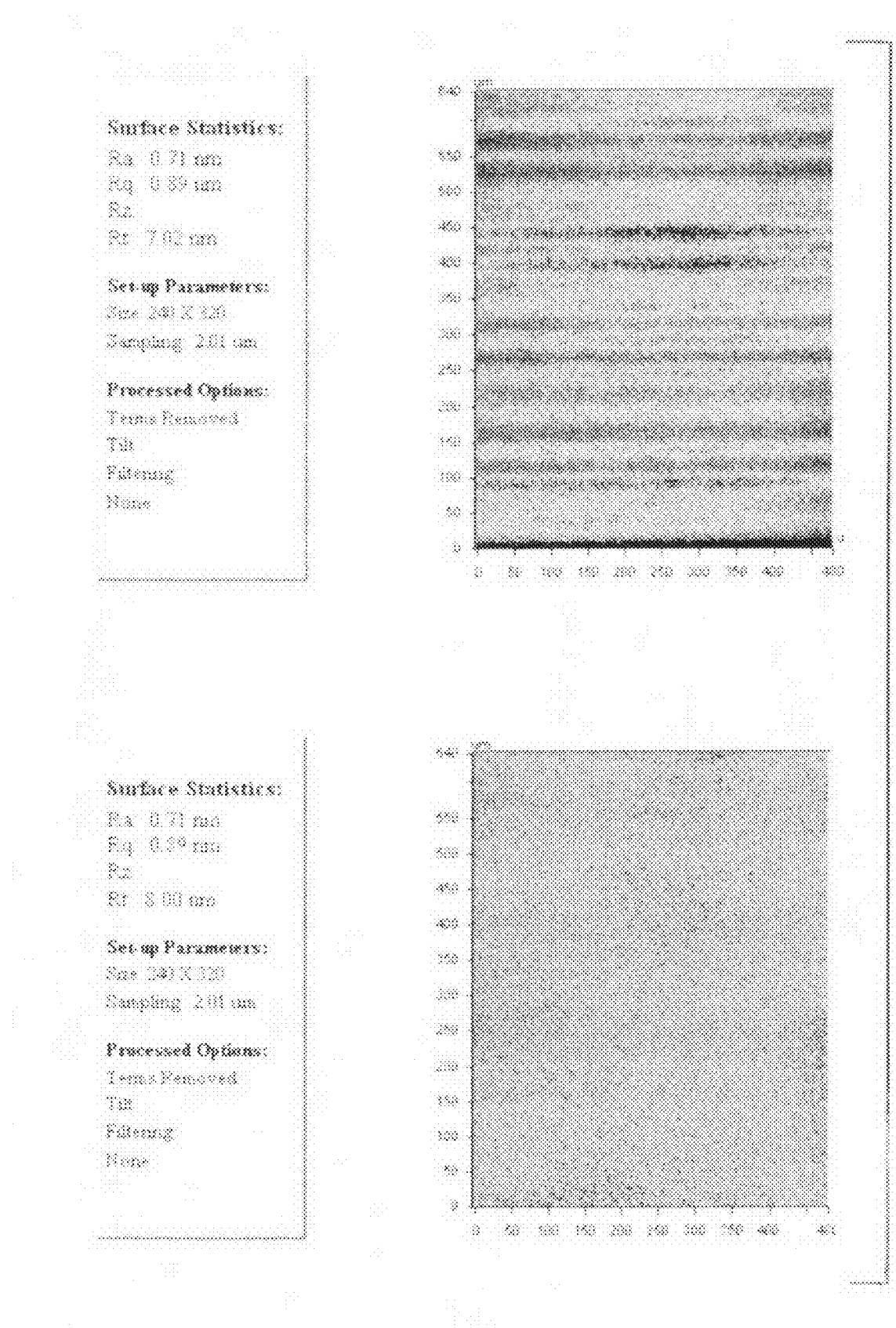
FIG. 1 is an illustration of the typical fringe-like noise produced by random errors in the scanner position of an interferometric profiler when a conventional n-frame PSI algorithm is used (top image) and of the automatic random-error suppression produced by the integration operation in the demodulation filter of the HDVSI procedure (bottom image).

The gist of the invention lies in the use of a reference signal to perfect the calculation of phase and coherence peak in the HDVSI algorithm described in Ser. No. 11/473,447. In particular, a true step size is calculated at each scanner step using a parallel reference signal generated during the sample scan. Such true step size is then used instead of the nominal scanner step in the HDVSI algorithms used to calculate phase and coherence peak in real time. This substitution has been found to correct all scanner-position errors introduced during the data-acquisition scan of the object.

The invention for convenience is described throughout in terms of VSI (i.e., the process of determining the coherence peak of an interferogram produced by a mechanical scan), but the term is intended to refer as well and include any coherence-peak sensing method that may be applicable to the procedure of the invention. Therefore, the broader notion of producing a map of the sample surface by finding the coherence peak of fringe patterns, however the fringe signals are produced, is intended to be part of and covered by this invention. In particular, the invention is intended to include any method that produces fringe patterns by a scanning process, such as through fringe projection or by changing the optical path difference between a test and a reference beam by means of, without limitation, mechanical scanning and polarization shifting methods. Similarly, "reference signal" is intended to refer to any measurement of OPD resulting from a nominal scan step, regardless of how that measurement is obtained. Accordingly, the invention is intended for application to any optical profilometer that produce fringe patterns as a result of scanning, including, without limitation, interference, confocal and fringe-projection systems.

When scanner nonlinearities are present, the actual scan step measured by the reference signal, $\Delta z_n$, can be represented by the equation $$\Delta z_n = \Delta z_0 + \delta_n, \tag{19}$$

where $\Delta z_0$ is the nominal scanner step and $\delta_n$ is the error introduced by scanner nonlinearities at step n. According to the invention, the step produced by the reference signal is used as the filter parameter in the quadrature demodulation algorithm of Equations 2A and 2b. Thus, these equations become $$Q_n = G(z_n - z_0)\cos(n2k_0\Delta z_n - \Phi)\sin(n2k_0\Delta z_n) \text{ and} \tag{20a}$$

$$J_n = G(z_n - z_0)\cos(n2k_0\Delta z_n - \Phi)\cos(n2k_0\Delta z_n). \tag{20b}$$

Substituting with Equation 19 and following through with the derivation of the ratio $\Sigma Q/\Sigma J$ for a nominal step $\Delta z_n = \lambda_0/8$ (corresponding to a phase step of $\pi/2$ because of the double OPD change) yields the following:

$$\frac{\sum_{n=1}^{N} Q_n}{\sum_{n=1}^{N} J_n} = \frac{\sum_{n=1}^{N}\sin(n(\pi + 2k_0\delta_n) - \Phi) + \sum_{n=1}^{N}\sin(\Phi)}{\sum_{n=1}^{N}\cos(n(\pi + 2k_0\delta_n) - \Phi) + \sum_{n=1}^{N}\cos(\Phi)} = \tag{21}$$

$$\frac{\sum_{n=1}^{N}(-1)^n\sin(2nk_0\delta_n - \Phi) + \sum_{n=1}^{N}\sin(\Phi)}{\sum_{n=1}^{N}(-1)^n\cos(2nk_0\delta_n - \Phi) + \sum_{n=1}^{N}\cos(\Phi)},$$

from Equation 7a.

Noting that $$\sum_{n=1}^{N}(-1)^n\sin(2nk_0\delta_n - \Phi) \cong \sum_{n=1}^{N}(-1)^n\cos(2nk_0\delta_n - \Phi) \cong 0,$$

the arctangent function becomes $$\Phi = \tan^{-1}\left(\frac{\sin(\Phi)}{\cos(\Phi)}\right) = \tan^{-1}\left(\frac{\sum_{n=1}^{N} Q_n}{\sum_{n=1}^{N} J_n}\right). \tag{22}$$

Figure 2:
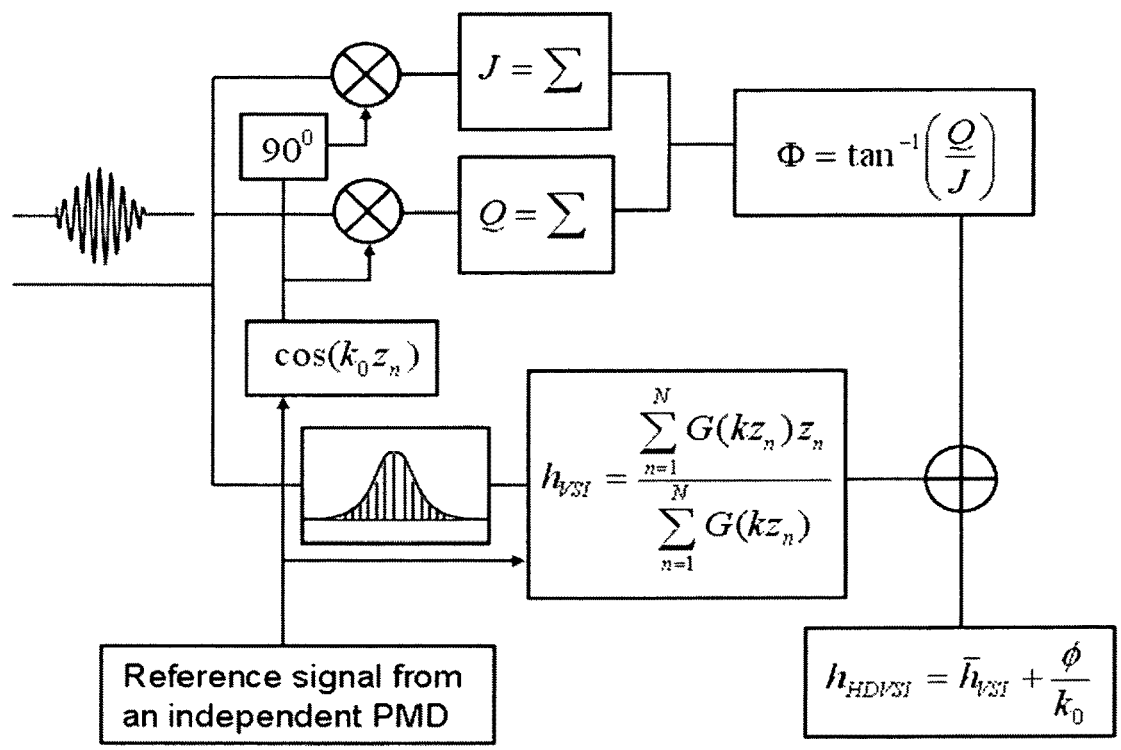
FIG. 2 is a diagram representing the application of a reference-signal scanning step to the HDVSI algorithm according to the invention.

That is, if the true scanner position produced by the reference signal is used in the demodulation filter of the HDVSI algorithm, the error due to scanner nonlinearities is suppressed. This error correction algorithm is illustrated in FIG. 2. Note that the reference signal is applied both to the phase-demodulation module and to the coherent-peak-detection module simultaneously for parallel real-time data processing.

Figure 3:
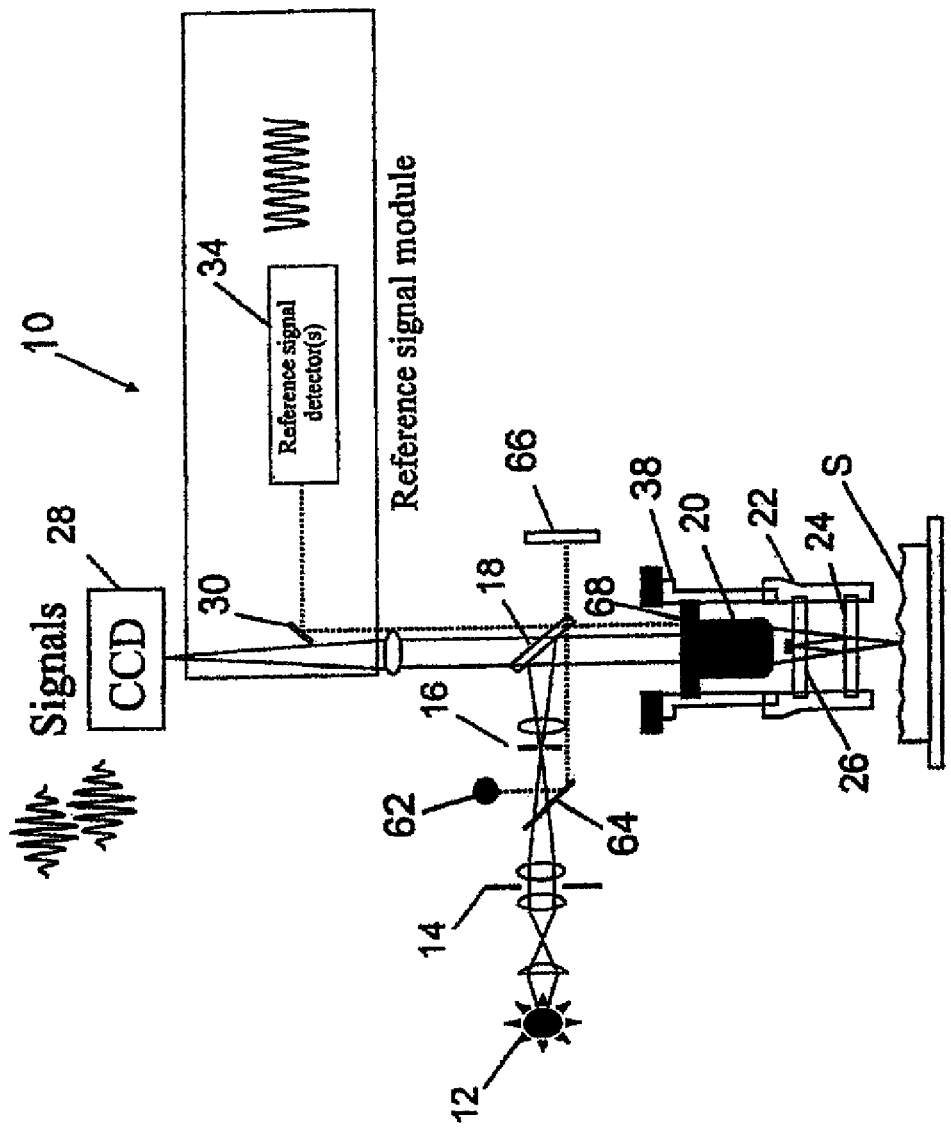
FIG. 3 is a schematic representation of an embodiment of the invention with an internal reference interferometer sharing part of the optical path with the profilometer.
Figure 4:
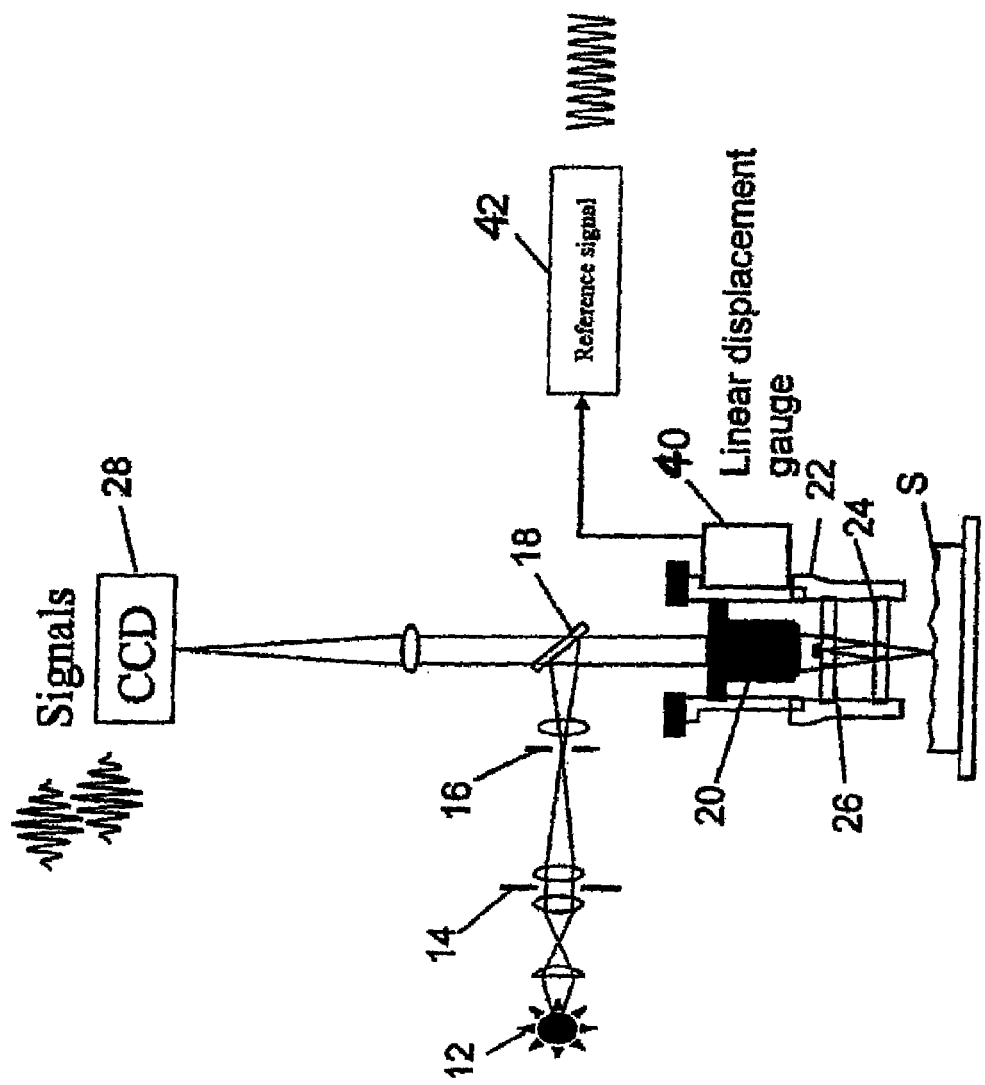
FIG. 4 is a schematic representation of an embodiment of the invention wherein the reference signal is produced by non-optical means.

As taught in U.S. Pat. No. 6,624,893, No. 6,624,894 and 6,987,570, the invention may be practiced, for instance, using a reference signal generated by a vertical scanning interferometer equipped with a reference-signal channel, as illustrated in FIG. 3. However, any other arrangement capable of producing an independent and precise measure of the scanner's relative displacement with respect to a known position in the z direction at each data acquisition frame may be used, including a reference signal that is produced by non-optical means, as illustrated in FIG. 4. (See also, for example, the different approaches taught in U.S. Pat. No. 7,277,183 and No. 7,321,430, to calculate the precise scanner step, which can be used in the same manner as a reference signal.

With reference to FIG. 3, wherein like parts are designated with the same numerals and symbols used throughout the drawings, the interferometer 10 comprises a light source 12 (such as white-light) directing a beam of light through an aperture 14 and field stop 16 toward a beam splitter 18 that reflects the light in the direction of a test surface S. The light reflected by the beam splitter 18 passes through a microscope objective 20 focused on the test surface S. The objective incorporates an interferometer 22, such as Mirau, comprising a beam splitter 24 and a reference mirror 26 adapted for relative movement with respect to the test surface, so that two light beams are generated for producing interference fringes as a result of the optical path difference between the reference mirror and the test surface S. The beams reflected from the reference mirror 26 and the test surface S pass back up through the optics of the microscope objective 20 and through the beam splitter 18 to a solid-state detector array 28 in a camera in coaxial alignment with the objective 20.

Typically, the detector array 28 consists of individual CCD cells or other sensing apparatus adapted to produce a twodimensional array of digitized intensity data corresponding to light signals received at each sensor cell as a result of the interference of the coherent light beams reflected from individual x-y coordinates or pixels in the surface S and from corresponding coordinates in the reference mirror 26. Appropriate electronic hardware (not shown) is provided to transmit the digitized intensity data generated by the detector to a microprocessor for processing. The microscope objective 20, as well as the interferometer typically incorporated within it, is adapted for vertical movement to focus the image of the test surface on the detector array 28.

According to the invention described in U.S. Pat. No. 6,624,893, No. 6,624,894 and 6,987,570, an additional reference-signal interferometer is built into the conventional measurement interferometer of the instrument and is dedicated to monitor OPD changes through a separate reference-signal channel. The two interferometers can share a significant portion of the profiler's optics (such as the beam splitter 18 and various lenses), but provide independent signal channels that can be tuned separately without affecting either the measurement or the reference path. In one implementation of this embodiment illustrated in FIG. 4, a laser 62 is used to provide enough light for a good-quality reference signal and a beamsplitter 64 is added in the optical measurement path to direct the laser beam toward the main splitter 18. A portion of the light is passed through to a reference mirror 66 for the reference signal, while the balance of the light is reflected toward a mirror or other reflective element 68 (such as a corner cube or a reflecting grating) placed on the moving part of the scanner 38 of the measurement interferometer. This approach has the advantage that the reference signal travels much of the same path as the measurement light, thus providing accurate information about the OPD change rate during the scan.

As the scanner 38 of the interferometer 22 scans through its vertical range of operation, the reference signal is recorded in conventional manner and the irradiance data so collected are used to calculate the actual z position of the scanner at each acquisition frame. Any of the many interferometric techniques used in the art for calibration of profiler scanners and/or interferometric analysis (including methods used in distance measurement interferometry, DMI) can be utilized to calculate the distance between frames corresponding to each scanning step.

Alternatively, as shown in FIG. 4, any position device 40 that provides a precise measure (through appropriate hardware 42) of the scanner's relative displacement with respect to a known position in the z direction at each data acquisition frame would be suitable for practicing the invention in equivalent manner. For example, currently available displacement gauges, such as linear encoders, capacitive sensors, linear variable differential transformers (LVDTs), and eddy-current sensors (all represented schematically by reference numeral 40), provide measurements with precision in the order of nanometers which could be used advantageously to practice the invention.

Figure 5:
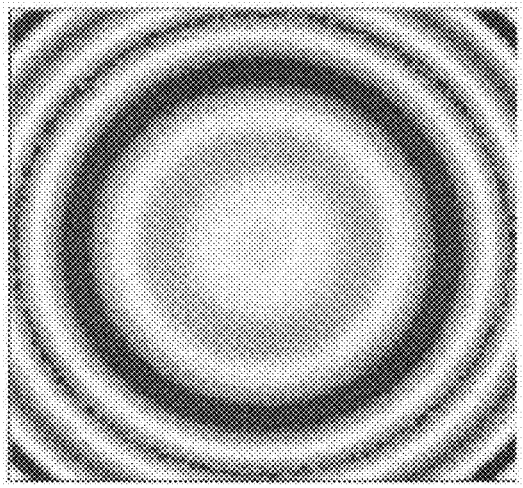
FIG. 5 is an illustration of the fringe-like noise produced by scanner nonlinearities in measuring a smooth spherical surface with the HDVSI algorithm.
Figure 6:
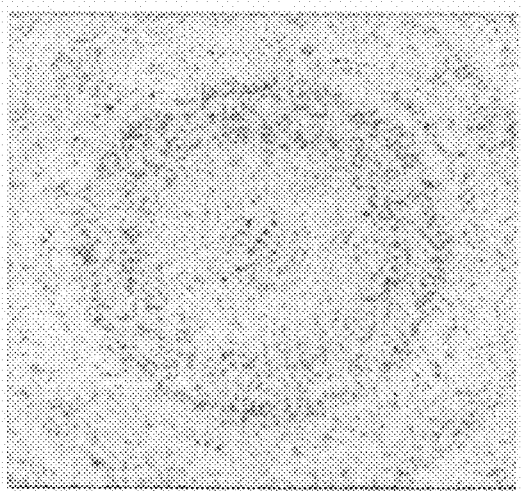
FIG. 6 shows the effect of the error-correction method of the invention when applied to the interferometric data of FIG. 5.

FIGS. 5 and 6 illustrate the effect of the error-correction method of the invention. FIG. 5 shows the irregular fringe-like error produced by an HDVSI scan of a very smooth spherical surface when uncorrected scanner nonlinearities are present. FIG. 6 shows the much improved phase map without the fringelike error produced with the same irradiance data when the error correction of the invention is implemented as described.

While the present invention has been shown and described herein in what is believed to be the most practical and preferred embodiments, it is recognized that departures can be made therefrom within the scope of the invention. For example, neither the VSI-scan nor the phase parameter of the QD-filter used for calculation of the phase of the correlogram has to equal $\pi/2$, but it should be chosen to equal the value that is most appropriate for conducting the VSI scan. Also, the invention has been described in terms of a quadrature demodulation algorithm used to calculate phase in real time. However, it is recognized that quadrature demodulation is a particular case of wavelet filtering and that, as such, other wavelet filters may be used as well.

As mentioned above, the invention has been described with reference to a conventional vertical scanning system; however, it is understood that it is equally applicable to any optical profilometer that produces fringe patterns by a form of scanning. Therefore, the invention is not to be limited to the details disclosed herein but is to be accorded the full scope of the claims so as to embrace any and all equivalent processes and products.

The invention claimed is:

1. A method for producing a height map of a sample with correction of errors produced by scanner nonlinearities, the method comprising the following steps:
   producing a plurality of signals from a fringe pattern; and
   calculating the map of the sample by application of a quadrature-demodulation technique on said signals;
   wherein said quadrature-demodulation technique utilizes a phase parameter equal to a scan step produced by a reference signal.

2. A method for producing a height map of a sample with correction of errors produced by scanner nonlinearities, the method comprising the following steps:
   producing a plurality of signals from a fringe pattern;
   calculating a coarse map of the sample by application of a coherence-peak sensing technique on said signals;
   calculating a fine map of the sample surface by application of a quadrature-demodulation technique on said signals; and
   combining the coarse map and the fine map to produce a high-definition map of the sample;
   wherein said quadrature-demodulation technique utilizes a phase parameter equal to a scan step produced by a reference signal.

3. The method of claim 2, wherein said coherence-peak sensing technique and said quadrature-demodulation technique are carried out concurrently in real time during said scan step.

4. The method of claim 2, wherein said coherence-peak sensing technique utilizes a phase parameter equal to said scan step produced by the reference signal.

5. The method of claim 4, wherein said coherence-peak sensing technique and said quadrature-demodulation technique are carried out concurrently in real time during said scan step.

6. Apparatus for producing a height map of a sample surface with correction of errors produced by scanner nonlinearities, the apparatus comprising:
   means for scanning the sample surface at a predetermined scan step to produce a plurality of signals registered on a detector from a fringe pattern;
   means for calculating a coarse map of the sample surface by application of a coherence-peak sensing technique on said signals;
   means for calculating a fine map of the sample surface by application of a quadrature-demodulation technique on the signals; and means for combining the coarse map and the fine map to produce a high-definition map of the sample surface;
wherein said quadrature-demodulation technique utilizes a phase parameter equal to a scan step produced by a reference signal.

7. The apparatus of claim 6, wherein said means for calculating a coarse map and said means for calculating a fine map of the sample surface are operated concurrently in real time.

8. The apparatus of claim 6, wherein said coherence-peak sensing technique utilizes a phase parameter equal to said scan step produced by the reference signal.

9. The apparatus of claim 8, wherein said means for calculating a coarse map and said means for calculating a fine map of the sample surface are operated concurrently in real time.

* * * * *